(12) United States Patent
Kang et al.

(10) Patent No.: US 8,459,828 B2
(45) Date of Patent: Jun. 11, 2013

(54) BACKLIGHT ASSEMBLY AND DISPLAY DEVICE HAVING THE SAME

(75) Inventors: Sang-Min Kang, Siheung-si (KR); Jong-Dae Park, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 12/837,013

(22) Filed: Jul. 15, 2010

(65) Prior Publication Data

US 2010/0284171 A1 Nov. 11, 2010

Related U.S. Application Data

(63) Continuation of application No. 11/104,150, filed on Apr. 12, 2005, now abandoned.

(30) Foreign Application Priority Data

Apr. 12, 2004 (KR) .......................... 10-2004-0024830

(51) Int. Cl.
*F21V 21/00* (2006.01)
(52) U.S. Cl.
USPC ............ 362/217.04; 362/217.01; 362/217.16; 362/219; 362/227; 362/240; 362/249.01; 362/260; 362/559
(58) Field of Classification Search
USPC .............. 362/29, 30, 217.01, 217.02, 217.04, 362/217.16, 219, 227, 240, 249.01, 260, 362/559
See application file for complete search history.

(56) References Cited

U.S. PATENT DOCUMENTS

| | | | |
|---|---|---|---|
| 6,641,281 B2 * | 11/2003 | Cheng | 362/217.14 |
| 6,783,256 B2 | 8/2004 | Moon | |
| 7,015,632 B2 | 3/2006 | Kobayashi et al. | |
| 7,059,736 B2 * | 6/2006 | Yu et al. | 362/97.1 |
| 7,090,387 B2 | 8/2006 | Kohno | |
| 7,172,330 B2 * | 2/2007 | Lee et al. | 362/634 |
| 7,207,710 B2 * | 4/2007 | Kim | 362/634 |
| 7,325,964 B2 * | 2/2008 | Kim | 362/634 |
| 2002/0044437 A1 | 4/2002 | Lee | |
| 2003/0142487 A1 | 7/2003 | Fan | |
| 2003/0189827 A1 | 10/2003 | Cheng | |
| 2004/0012971 A1 * | 1/2004 | Tsai et al. | 362/390 |
| 2004/0150981 A1 | 8/2004 | Katsuda et al. | |
| 2004/0228111 A1 | 11/2004 | Kuo et al. | |

(Continued)

FOREIGN PATENT DOCUMENTS

| | | |
|---|---|---|
| JP | 01-137512 A | 5/1989 |
| JP | 07-072476 A | 3/1995 |

(Continued)

*Primary Examiner* — Mary McManmon
(74) *Attorney, Agent, or Firm* — Cantor Colburn LLP

(57) ABSTRACT

A backlight assembly includes a lamp unit, a covering member, a panel guiding member and a lamp supporting member. The lamp unit has a first electrode and a second electrode disposed at a first side of the lamp unit and a curved portion disposed at a second side of the lamp unit that is opposite to the first side. The covering member covers at least one of a first region corresponding to the first and second electrodes and a second region corresponding to the curved portion. The panel guiding member is configured to support a display panel that displays images using light generated by the lamp unit. The lamp supporting member is configured to retain the lamp unit. Therefore, a number of inverters may be reduced, thereby lowering cost and time of manufacturing the backlight assembly. Furthermore, reliability of the backlight assembly may be enhanced.

22 Claims, 8 Drawing Sheets

U.S. PATENT DOCUMENTS

| | | |
|---|---|---|
| 2004/0257792 A1 | 12/2004 | Yu et al. |
| 2005/0041411 A1 | 2/2005 | Wu |
| 2005/0094389 A1 | 5/2005 | Peng et al. |

FOREIGN PATENT DOCUMENTS

| | | |
|---|---|---|
| JP | 08045327 A | 2/1996 |
| JP | 2001210126 | 8/2001 |
| JP | 2001210126 A * | 8/2001 |
| JP | 2002311418 A | 10/2002 |
| JP | 2006-066363 A | 3/2006 |
| TW | 543016 | 7/2003 |
| TW | 567291 | 12/2003 |
| TW | 200401869 | 2/2004 |

* cited by examiner

BACKLIGHT ASSEMBLY AND DISPLAY DEVICE HAVING THE SAME

CROSS REFERENCE TO RELATED APPLICATIONS

This application is a continuation application of U.S. application Ser. No. 11/104,150 filed Apr. 12, 2005, which claims priority to Korean Patent Application No. 10-2004-24830, filed on Apr. 12, 2004, the content of which in its entirety is herein incorporated by reference.

BACKGROUND OF THE INVENTION

1. Field of the Invention

The present invention relates to a backlight assembly and a liquid crystal display device having the backlight assembly. More particularly, the present invention relates to a backlight assembly having improved image display quality and a liquid crystal display device employing the backlight assembly.

2. Description of the Related Art

Display devices display images in accordance with data processed by an information processing apparatus. A liquid crystal display (LCD) device is a type of display device that displays images using liquid crystal. In order to display images, liquid crystal molecules are rearranged according to electric fields applied to the liquid crystal.

The LCD device does not emit light, but rather changes transmissivity of light. Therefore, the LCD device requires a light source in order to display images. The LCD device employs a backlight assembly as the light source. The backlight assembly may be classified as either an edge illumination type or a direct illumination type depending on a position of lamps in the backlight assembly.

In the edge illumination type backlight assembly, a lamp is disposed at a position adjacent to a side face of a light guide plate. The edge illumination type backlight assembly is mainly used for small-sized display devices such as a laptop computer, a mobile phone, etc.

In the direct illumination type backlight assembly, a plurality of lamps are disposed under a diffusion plate. A luminance of the direct illumination type backlight assembly is higher than that of the edge illumination type backlight assembly. Thus, the direct illumination type backlight assembly is mainly used for large-sized display devices such as television displays.

A conventional direct illumination type backlight assembly has straight type lamps arranged substantially parallel to each other. The straight type lamps are fixed by a plurality of lamp-fixing members. For example, one of the straight type lamps is fixed by at least one lamp-fixing member disposed at each end portion of the straight type lamps. Thus, when a number of straight type lamps increases, a number of the lamp-fixing members also increases. For example, when the conventional direct illumination type backlight assembly employs six straight type lamps, twelve lamp-fixing members are required in order to fix the six straight type lamps. Therefore, both the cost and time of manufacturing the backlight assembly increase, thereby lowering productivity.

SUMMARY OF THE INVENTION

The present invention provides a backlight assembly capable of enhancing productivity and reducing manufacturing cost. The present invention also provides a display device having the above-mentioned backlight assembly.

In an exemplary backlight assembly according to the present invention, the backlight assembly includes a lamp unit, a covering member, a panel guiding member and a lamp supporting member. The lamp unit has a first electrode and a second electrode disposed at a first side of the lamp unit and a curved portion disposed at a second side of the lamp unit that is opposite to the first side. The covering member covers at least one of a first region corresponding to the first and second electrodes and a second region corresponding to the curved portion. The panel guiding member is configured to support a display panel that displays images using light generated by the lamp unit. The lamp supporting member is configured to retain the lamp unit.

In another exemplary backlight assembly according to the present invention, the backlight assembly includes a lamp unit, a first covering member, a second covering member, a panel guiding member and a lamp supporting member. The lamp unit has a first electrode and a second electrode disposed at a first side of the lamp unit and a curved portion disposed at a second side of the lamp unit that is opposite to the first side. The first and second covering members have first and second apertures, respectively, which receive the lamp unit. The panel guiding member is configured to support a display panel that displays images using light generated by the lamp unit. The lamp supporting member is configured to retain the lamp unit.

In another exemplary backlight assembly according to the present invention, the backlight assembly includes a plurality of lamps, a receiving container, a first covering member, a second covering member, a panel guiding member and a lamp supporting member. Each of the lamps includes a first electrode and a second electrode disposed at a first side of the plurality of lamps and a curved portion disposed at a second side of the plurality of lamps that is opposite to the first side. The receiving container has a first side, a second side, a third side and a fourth side. The receiving container receives the plurality of lamps. The first and second covering members have first and second apertures, respectively, which receive the plurality of lamps. The panel guiding member is configured to support a display panel that displays images using light generated by the lamp unit. The lamp supporting member configured to retain the lamps.

In an exemplary display apparatus according to the present invention, the display apparatus includes a backlight assembly and a display unit. The backlight assembly includes a lamp unit, a covering member, a lamp supporting member, a diffusion plate and a panel guiding member. The lamp unit has a first electrode and a second electrode adjacently disposed at a first side of the lamp unit and a curved portion disposed at a second side of the lamp unit that is opposite to the first side. The covering member covers at least one of a first portion of the lamp unit corresponding to the first and second electrodes and a second portion of the lamp unit corresponding to the curved portion. The lamp supporting member is configured to retain the lamp unit. The diffusion plate is configured to diffuse light generated by the lamp unit. The panel guiding member is configured to support a display panel that displays images using light generated by the lamp unit of the backlight assembly. The display unit displays images using light generated by the backlight assembly, the display unit having a display region and a peripheral region surrounding the display region. Therefore, a number of inverters may be reduced to lower cost and time of manufacturing the backlight assembly.

Additionally, the lamp supporting member prevents the diffusion plate from sagging. Thus, the lamp supporting member keeps a uniform distance between the lamp unit and the diffusion plate to enhance uniformity of luminance between regions.

This application relies for priority upon Korean Patent Application No. 2004-24830 filed on Apr. 12, 2004, the contents of which are herein incorporated by reference in its entirety.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Hereinafter, the embodiments of the present invention will be described in detail with reference to the accompanied drawings.

Figure 1:
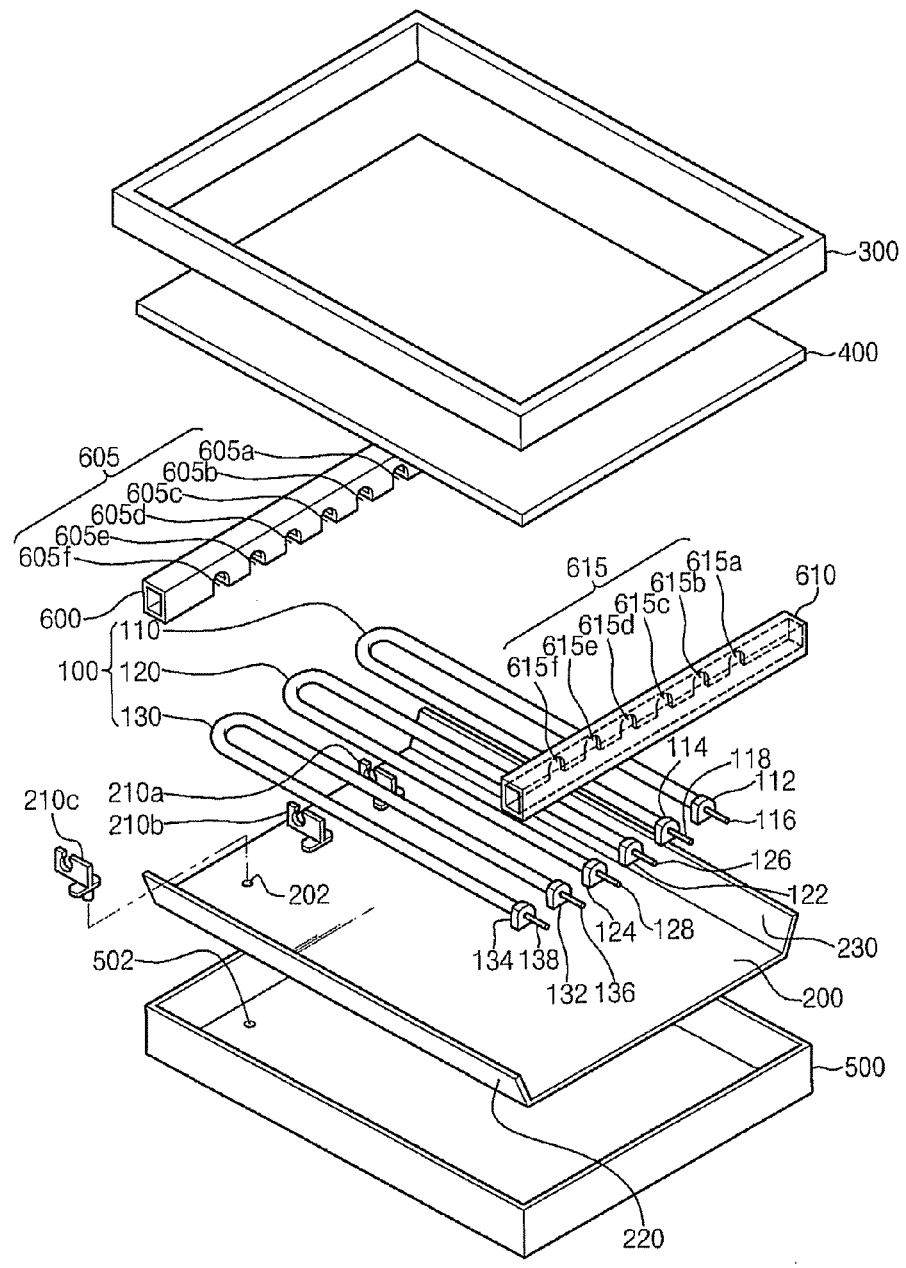
FIG. 1 is an exploded perspective view illustrating a backlight assembly according to an exemplary embodiment of the present invention.

FIG. 1 is an exploded perspective view illustrating a backlight assembly according to an exemplary embodiment of the present invention.

Referring to FIG. 1, a backlight assembly according to an exemplary embodiment of the present invention includes a lamp unit 100, a reflection plate 200, a first receiving container (mold frame or panel guiding member) 300, a diffusion plate 400, a second receiving container (or bottom chassis) 500, a first covering member 600 and a second covering member 610.

The lamp unit 100 includes first, second and third lamps 110, 120 and 130, and first, second, third, fourth, fifth and sixth lamp holders 112, 114, 122, 124, 132 and 134. Each of the first, second and third lamps 110, 120 and 130 has a hot electrode (not shown) and a cold electrode (not shown). The first and second lamp holders 112 and 114 hold the hot electrode and the cold electrode of the first lamp 110, respectively. The third and fourth lamp holders 122 and 124 hold the hot electrode and the cold electrode of the second lamp 120, respectively. The fifth and sixth lamp holders 132 and 134 hold the hot electrode and the cold electrode of the third lamp 130, respectively.

Each of the first, second and third lamps 110, 120 and 130 has the hot and cold electrodes adjacently disposed such that the hot and cold electrodes are at a same side each of the first, second and third lamps 110, 120 and 130. In other words, each of the first, second and third lamps 110, 120 and 130 has a general U-shape or a general C-shape. Therefore, the first, second and third lamps 110, 120 and 130 having the general U-shape or the general C-shape correspond to six straight type lamps.

The lamp unit 100 further includes first, second, third, fourth, fifth and sixth lamp wires 116, 118, 126, 128, 136 and 138. The first and second lamp wires 116 and 118 are electrically connected to the hot electrode and the cold electrode of the first lamp 110, respectively. The third and fourth lamp wires 126 and 128 are electrically connected to the hot electrode and the cold electrode of the second lamp 120, respectively. The fifth and sixth lamp wires 136 and 138 are electrically connected to the hot electrode and the cold electrode of the third lamp 130, respectively.

The first and second lamp wires 116 and 118 have substantially a same length because the hot and cold electrodes of the first lamp 110 are each disposed at a same side of the backlight assembly. The third and fourth lamp wires 126 and 128 have substantially a same length because the hot and cold electrodes of the second lamp 120 are each disposed at a same side of the backlight assembly. The fifth and sixth lamp wires 136 and 138 have substantially a same length because the hot and cold electrodes of the third lamp 130 are each disposed at a same side of the backlight assembly.

In the present embodiment, the backlight assembly employs three lamps 110, 120 and 130 having the general U-shape or the general C-shape. It should be noted, however, that a number and a shape of lamps in the lamp unit 100 may be varied.

The reflection plate 200 is disposed under the lamp unit 100. The reflection plate 200 reflects light generated by the lamp unit 100, which advances toward the reflection plate 200. Light reflected by the reflecting plate 200 then advances toward the diffusion plate 400. The reflection plate 200 includes a bottom plate. The reflection plate 200 may further include a first inclined plate 220 and a second inclined plates 230 extended from the bottom plate and slanted with respect to the bottom plate.

The reflection plate 200 further includes a first lamp supporting member 210a, a second lamp supporting member 210b and a third lamp supporting member 210c that retain the first, second and third lamps 110, 120 and 130, respectively. The first, second and third lamp supporting members 210a, 210b and 210c are disposed at the bottom plate of the reflection plate 200, such that the first, second and third lamp supporting members 210a, 210b and 210c correspond to an apex of a curved portion of each of the first, second and third lamps 110, 120 and 130. In other words, the first, second and third lamp supporting members 210a, 210b and 210c are disposed at a side of the bottom plate, which is opposite to a side at which the hot and cold electrodes are disposed. The first, second and third lamp supporting members 210a, 210b and 210c support the first, second and third lamps 110, 120 and 130, respectively. Therefore, a number of lamp supporting members is same as the number of lamps.

Figure 2:
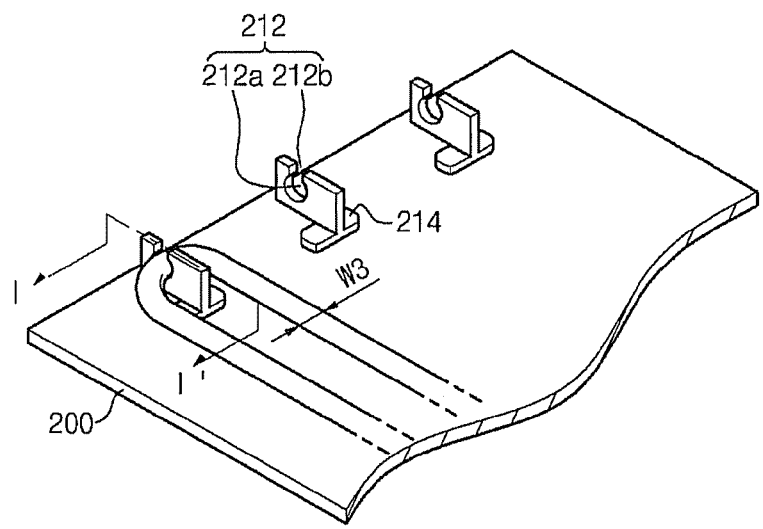
FIG. 2 is an enlarged perspective view illustrating a portion of the backlight assembly of FIG. 1 having lamp supporting members.
Figure 3:
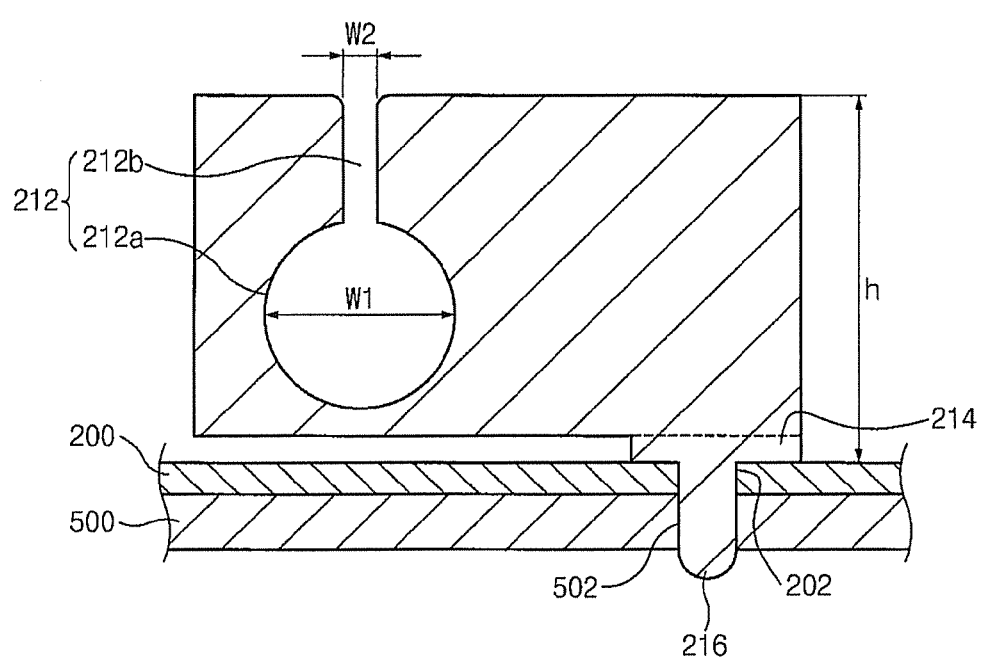
FIG. 3 is a cross-sectional view taken along line I-I' in FIG. 2.

FIG. 2 is an enlarged perspective view illustrating a portion of the backlight assembly of FIG. 1 having first, second and third lamp supporting members 210a, 210b and 210c, and FIG. 3 is a cross-sectional view taken along line I-I' in FIG. 2.

Referring to FIGS. 2 and 3, each of the first, second and third lamp supporting members 210a, 210b and 210c includes a supporting body 212, a first fixing unit 214 and a second fixing unit 216 formed with the supporting body 212. The supporting body 212 supports one of the first, second and third lamps 110, 120 and 130 to prevent movement of the first, second and third lamps 110, 120 and 130. The first and second fixing units 214 and 216 attach the supporting body 212 to the reflection plate 200 and the bottom chassis 500.

The supporting body 212 has a substantially rectangular shaped plate having a predetermined thickness. The supporting body 212 has an aperture 212a, which has a diameter of w1. A region connecting a center of the aperture 212a with an upper portion of the supporting body 212 is removed to form a channel 212b that opens the aperture 212a. One of the first, second and third lamps 110, 120 and 130 is inserted into the aperture 212a through the channel 212b and is thereby attached to the supporting body 212.

The first, second and third lamp supporting members 210a, 210b and 210c include a flexible material such as, for example, silicon, polyethylene terephthalate (PET) or polymethylmethacrylate (PMMA), etc.

The diameter w1 of the aperture 212a is, for example, substantially same as an external diameter w3 of the first, second and third lamps 110, 120 and 130. In another embodiment, the diameter w1 may be smaller than the external diameter w3. In case that the diameter w1 of the aperture 212a is smaller than the external diameter w3 of the first, second and third lamps 110, 120 and 130, the first, second and third lamps 110, 120 and 130 may be fixed to the first, second and third lamp supporting members 210a, 210b and 210c, respectively.

A width w2 of the channel 212b is smaller than the diameter w1 of the aperture 212a. However, since the first, second and third lamp supporting members 210a, 210b and 210c include the flexible material, the channel 212b easily widens, so that one of the first, second and third lamps 110, 120 and 130 may be easily inserted into the aperture 212a through the channel 212b.

The first fixing unit 214 is protruded from the supporting body 212 such that a longitudinal length of the first fixing unit 214 is substantially perpendicular to the supporting body 212. Therefore, the first fixing unit 214 is extended along a surface of the reflection plate 200 to increase an area of the first fixing unit 214, which makes contact with the reflection plate 200. The supporting body 212 and the first fixing unit 214 form a T-shape when viewed from the perspective of one of the hot or cold electrodes. The supporting body 212 and the first fixing unit 214 have a height 'h' that is greater than the external diameter w3 of the first, second and third lamps 110, 120 and 130.

The second fixing unit 216 acts as a fixing rod and is protruded from a bottom surface of the first fixing unit 214. The second fixing unit 216 has a larger diameter than that of a first orifice 202 formed through the reflection plate 200 and a second orifice 502 formed through the bottom chassis 500. However, since the first, second and third lamp supporting members 210a, 210b and 210c include the flexible material, the second fixing unit may be inserted into the first and second holes 202 and 502. Therefore, when the second fixing unit 216 is inserted into the first orifice 202 of the reflection plate 200 and the second orifice 502 of the bottom chassis 500, the first, second and third lamp supporting members 210a, 210b and 210c are fixed to the reflection plate 200 and the bottom chassis 500. When the curved portion of each of the first, second and third lamps 110, 120 and 130 is inserted into a corresponding aperture 212a, the first, second and third lamps 110, 120 and 130 are attached to the first, second and third lamp supporting members 210a, 210b and 210c, respectively.

The second fixing unit 216 may include a separation preventing member (not shown) having an arrow shape formed at an end of the second fixing unit 216. Therefore, when the second fixing unit 216 is inserted into the first and second orifices 202 and 502, the separation preventing member prevents separation of the second fixing unit 216 from the reflection plate 200 and the bottom chassis 500.

Alternatively, the second fixing unit 216 may have a hook-shape, or the second fixing unit 216 may be removed from the first, second and third lamp supporting members 210a, 210b and 210c. If the first, second and third lamp supporting members 210a, 210b and 210c do not have the second fixing unit 216, the first, second and third lamp supporting members 210a, 210b and 210c may be attached to the reflection plate 200, for example, by means of double-faced adhesive tape disposed between the reflection plate 200 and the first fixing unit 214 of each of the first, second and third lamp supporting members 210a, 210b and 210c. It is contemplated that the first, second and third lamp supporting members 210a, 210b and 210c may have various other shapes as well.

Figure 4:
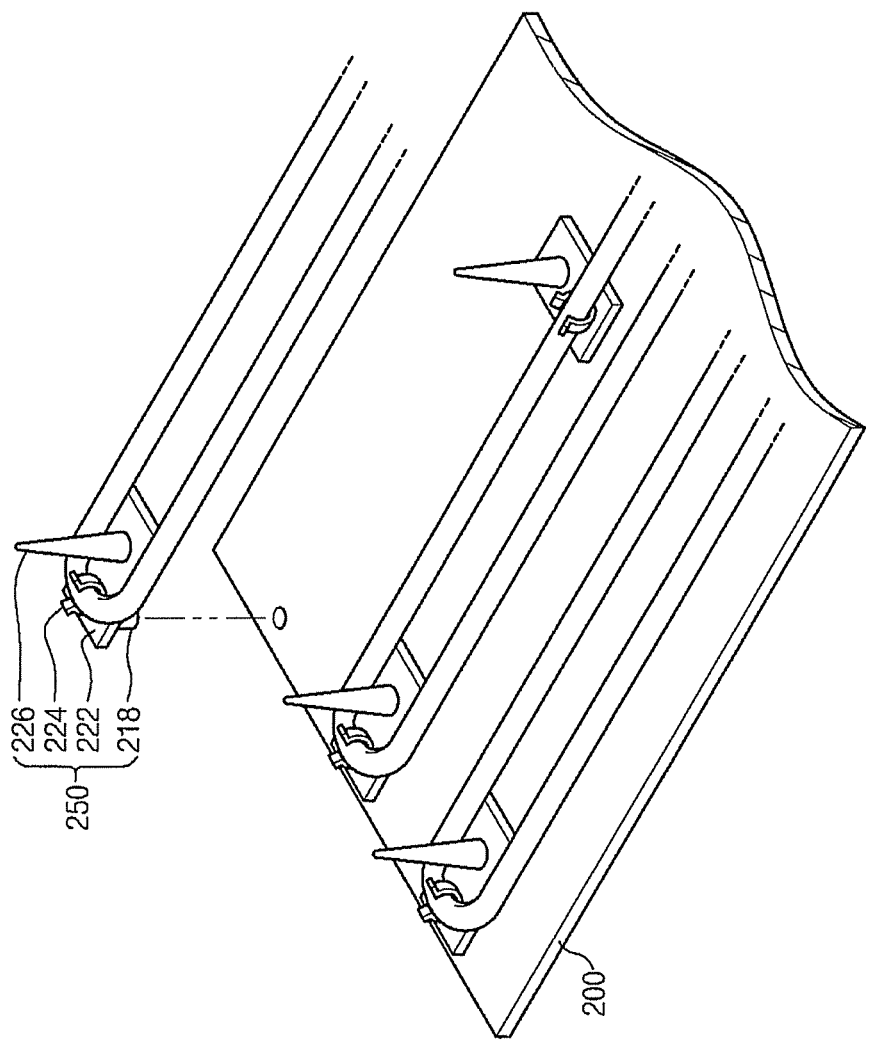
FIG. 4 is a partially exploded perspective view illustrating a portion of the backlight assembly of FIG. 1 having a different lamp supporting member according to an exemplary embodiment of the present invention.

FIG. 4 is a partially exploded perspective view illustrating a portion of the backlight assembly of FIG. 1 having a different lamp supporting member according to an exemplary embodiment of the present invention.

Referring to FIG. 4, a lamp supporting member 250 includes a supporting body 222, a lamp holder 224, a supporting horn 226 and a fixing unit 218. The supporting body 222 has a generally-rectangular plate shape having a predetermined thickness. The lamp holder 224 is disposed at an upper surface of the supporting body 222. The lamp holder 224 holds one of the first, second and third lamps 110, 120 and 130. The supporting horn 226 is disposed at the upper surface of the supporting body 222. The fixing unit 218 is protruded from a lower surface of the supporting body 222, and the fixing unit 218 fixes the supporting body 222 to the reflection plate 200 and the bottom chassis 500 (see FIG. 3).

The lamp holder 224 of each lamp supporting member 250 holds the first, second and third lamps 110, 120 and 130 to prevent movement of the first, second and third lamps 110, 120 and 130. The supporting body 222 and the fixing unit 218 attach the lamp holder 224 to the reflection plate 200 and the bottom chassis 500 as shown in FIG. 3.

The supporting horn 226 has a predetermined height such that the supporting horn 226 supports the first covering member 600 in FIG. 1. Therefore, compressive force from the first covering member 600 may not be applied to the first, second and third lamps 110, 120 and 130, thereby protecting the first, second and third lamps 110, 120 and 130.

The lamp supporting member 250 may be formed to support a straight portion of each of the first, second and third lamps 110, 120 and 130 or the apex of the curved portion of each of the first, second and third lamps 110, 120 and 130. Therefore, the lamp holder 224 of the lamp supporting member 250 fixes the first, second and third lamps 110, 120 and 130, and the supporting horn 226 supports the diffusion plate 400 disposed over the first, second and third lamps 110, 120 and 130.

Referring again to FIG. 1, the first covering member 600 is disposed at a first side of the lamp unit 100, and the second covering member 610 is disposed at a second side of the lamp unit 100 that is opposite to the first side. For example, the first covering member 600 is disposed at a region corresponding to the curved portion of each of the first, second and third lamps 110, 120 and 130, and the second covering member 610 is disposed at a region corresponding to the hot and cold electrodes of each of the first, second and third lamps 110, 120 and 130.

The first covering member 600 has a rectangular pipe shape having a vacant inner space extending through an entire longitudinal length of the first covering member 600. In other words, a cross section of the first covering member 600 has a rectangular frame-shape. The first covering member 600 includes a first insertion aperture group 605. Straight portions nearest the curved portions of each of the first, second and third lamps 110, 120 and 130 are inserted into corresponding portions of the first insertion aperture group 605. Therefore, the first insertion aperture group 605 includes a number of insertion apertures which is double the number of lamps. In an exemplary embodiment, the first insertion aperture group 605 includes six insertion apertures such as first, second, third, fourth, fifth and sixth insertion apertures 605a, 605b, 605c, 605d, 605e and 605f for corresponding portions of the first, second and third lamps 110, 120 and 130.

The second covering member 610 may have an identical shape as the first covering member 600. For example, the second covering member 610 has a rectangular pipe shape having a vacant inner space extending through an entire longitudinal length of the second covering member 610. A cross section of the second covering member 610 has a rectangular frame-shape. The second covering member 610 includes a second aperture group 615. The hot and cold electrodes of the first, second and third lamps 110, 120 and 130 are inserted into the second aperture group 615. The second aperture group 615 includes seventh to twelfth insertion apertures 615a, 615b, 615c, 615d, 615e and 615f.

Although the backlight assembly described above includes both the first and second covering members 600 and 610, it is also envisioned that the backlight assembly may include only one of the first and second covering members 600 and 610.

Figure 5:
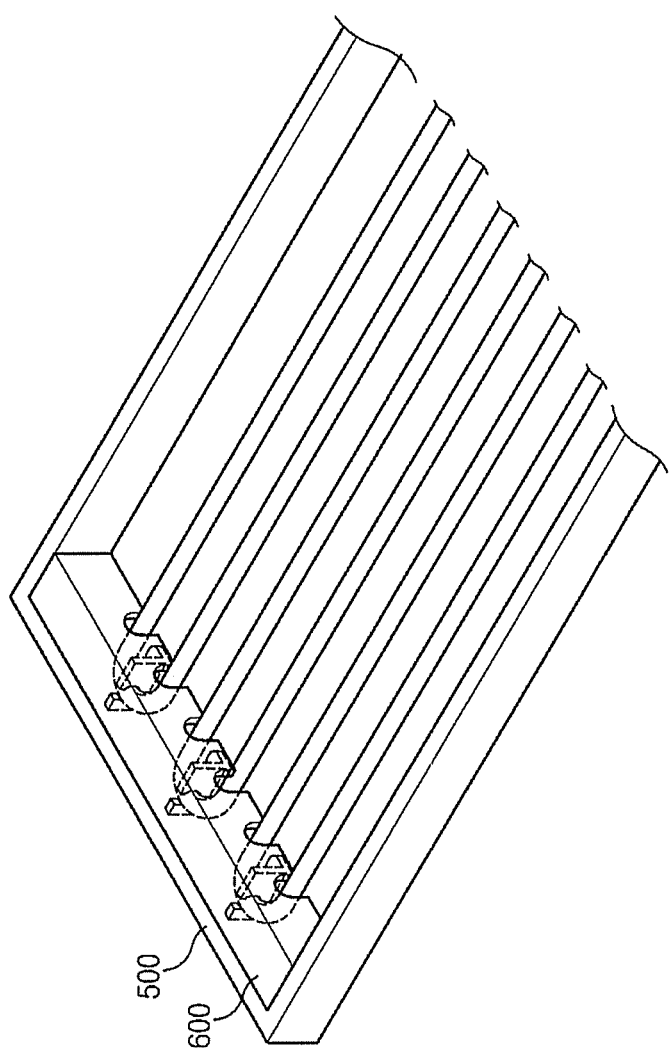
FIG. 5 is a perspective view illustrating a first covering member that covers a curved portion of a lamp according to an exemplary embodiment of the present invention.
Figure 6:
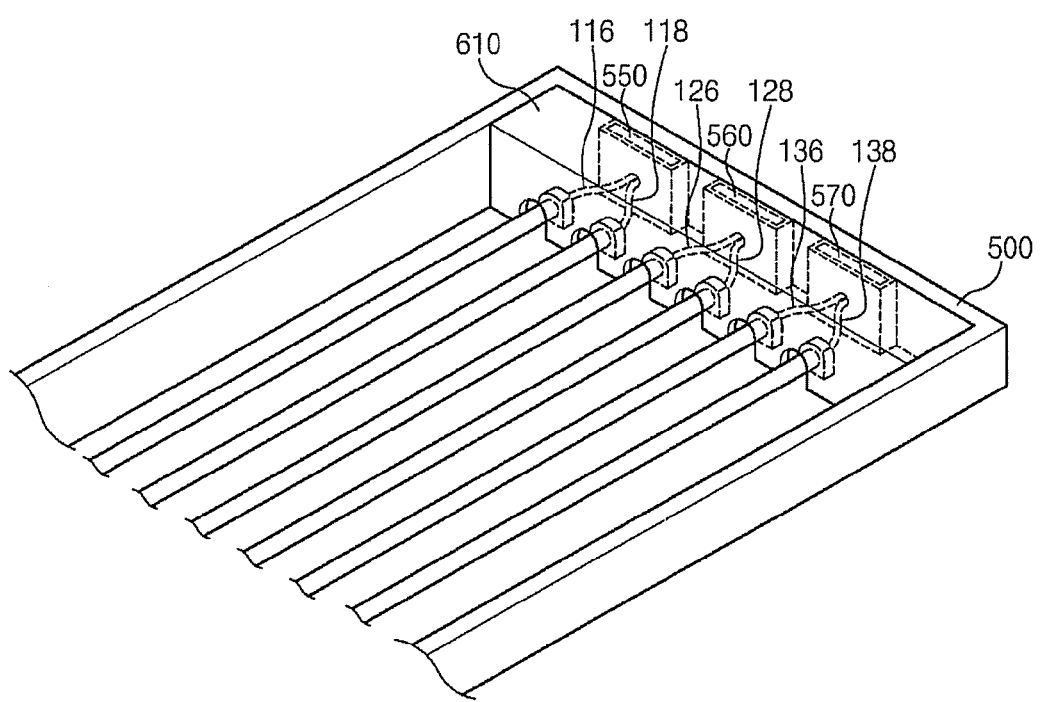
FIG. 6 is a perspective view illustrating a second covering member that covers a hot electrode or a cold electrode of a lamp according to an exemplary embodiment of the present invention.

FIG. 5 is a perspective view illustrating a first covering member that covers a curved portion of a lamp, and FIG. 6 is a perspective view illustrating a second covering member that covers hot and cold electrodes of the lamp.

Referring to FIGS. 5 and 6, the first covering member 600 is formed at a first side of the bottom chassis 500 such that the first covering member 600 makes contact with a first sidewall of the bottom chassis 500. The second covering member 610 is formed at a second side of the bottom chassis 500 such that the second covering member 610 makes contact with a second sidewall of the bottom chassis 500.

A connection portion between the curved portion and straight portions of each of the first, second and third lamps 110, 120 and 130 is inserted into the first, second, third, fourth, fifth and sixth insertion apertures 605a, 605b, 605c, 605d, 605e and 605f of the first covering member 600. Therefore, the curved portion of each of the first, second and third lamps 110, 120 and 130 is disposed inside the first covering member 600. The first, second and third lamp supporting members 210a, 210b and 210c are also disposed inside the first covering member 600. Therefore, only the straight portions of each of the first, second and third lamps 110, 120 and 130 are exposed as if six straight type lamps are arranged. Each of the straight portions of the first, second and third lamps 110, 120 and 130 is equally spaced apart from each other. For example, a distance between the hot electrode and the cold electrode is about 20.6 mm. Thus, the first, second and third lamps 110, 120 and 130 are disposed such that a distance between the straight portions of each adjacent one of the first, second and third lamps 110, 120 and 130 is also about 20.6 mm.

When the curved portions of the first, second and third lamps 110, 120 and 130 are exposed, light generated by the curved portions may induce a bright line displayed on a display panel. To prevent the bright line from being displayed, the first covering member 600 covers the curved portions.

The first, second and third lamp supporting members 210a, 210b and 210c have the height "h" that is greater than the external diameter w3 of the first, second and third lamps 110, 120 and 130 as shown in FIG. 3. Therefore, even when the first covering member 600 covers the curved portions of the first, second and third lamps 110, 120 and 130, the first covering member 600 does not make contact with the first, second and third lamps 110, 120 and 130. Furthermore, the supporting body 212 of each of the first, second and third lamp supporting members 210a, 210b and 210c is flexible. Therefore, each of the first, second and third lamps 110, 120 and 130 is protected from the first covering member 600.

The hot and cold electrodes of each of the first, second and third lamps 110, 120 and 130 are inserted into the seventh to twelfth insertion apertures 615a, 615b, 615c, 615d, 615e and 615f of the second covering member 610. For example, the first and second lamp holders 112 and 114 of the first lamp 110 are inserted into the seventh and eighth insertion apertures 615a and 615b, respectively. The third and fourth lamp holders 122 and 124 of the second lamp 120 are inserted into the ninth and tenth insertion apertures 615c and 615d, respectively. The fifth and sixth lamp holders 132 and 134 of the third lamp 130 are inserted into the eleventh and twelfth insertion apertures 615e and 615f, respectively.

A first inverter 550, a second inverter 560 and a third inverter 570 are each disposed at a sidewall of the bottom chassis 500. The hot and cold electrodes are disposed at a region of the sidewall of the bottom chassis 500. The first inverter 550 is electrically connected to the first and second wires 116 and 118 that are electrically connected to the hot and cold electrodes of the first lamp 110, respectively. The second inverter 560 is electrically connected to the third and fourth wires 126 and 128 that are electrically connected to the hot and cold electrodes of the second lamp 120, respectively. The third inverter 570 is electrically connected to the fifth and sixth wires 136 and 138 that are electrically connected to the hot and cold electrodes of the third lamp 130, respectively. Therefore, the first, second and third inverters 550, 560 and 570 apply a power voltage to the first, second and third lamps 110, 120 and 130, respectively.

For example, the first, second and third inverters 550, 560 and 570 apply the power voltage to the hot electrodes of the first, second and third lamps 110, 120 and 130, respectively, and apply a ground voltage to the cold electrodes of the first, second and third lamps 110, 120 and 130, respectively. Alternatively, the first, second and third inverters 550, 560 and 570 may apply a positive voltage to the hot electrodes, and a negative voltage to the cold electrodes. Thus, if generally U-shaped lamps are employed, a number of inverters may be reduced by half of a number of inverters employed in a backlight assembly having six straight type lamps.

Referring again to FIG. 1, the diffusion plate 400 is disposed over the first, second and third lamps 110, 120 and 130 to diffuse light generated from the first, second and third lamps 110, 120 and 130. The bottom chassis 500 receives the reflection plate 200, the lamp unit 100 and the diffusion plate 400. The bottom chassis 500 includes the second orifice 502 for fixing the first, second and third lamp supporting members 210a, 210b and 210c. The backlight assembly may further include a diffusion sheet (not shown) disposed on the diffusion plate 400 in order to diffuse the light from the diffusion plate 400 again, and at least one condensing sheet (not shown) for enhancing luminance.

The mold frame 300 is disposed on the diffusion plate 400 to compress the diffusion plate 400 toward the bottom chassis 500. The mold frame 300 supports a display panel (not shown) that is disposed thereon.

In the present embodiment, the reflection plate 200 is disposed between the lamp unit 100 and the bottom chassis 500. Alternatively, a reflective material may be coated on the bottom chassis 500 in lieu of the reflection plate 200, and the first, second and third lamp supporting members 210a, 210b and 210c may be combined directly with the bottom chassis 500.

Furthermore, the first and second covering members 600 and 610 are formed separately from the mold frame 300 in the present embodiment. Alternatively, the first and second covering members 600 and 610 may be integrally formed with the mold frame 300. For example, first insertion apertures for receiving the curved portions of each of the first, second and third lamps 110, 120 and 130 may be disposed at the first side of the mold frame 300, and second insertion apertures for receiving the hot and cold electrodes of each of the first, second and third lamps 110, 120 and 130 may be disposed at the second side of the mold frame 300.

Figure 7:
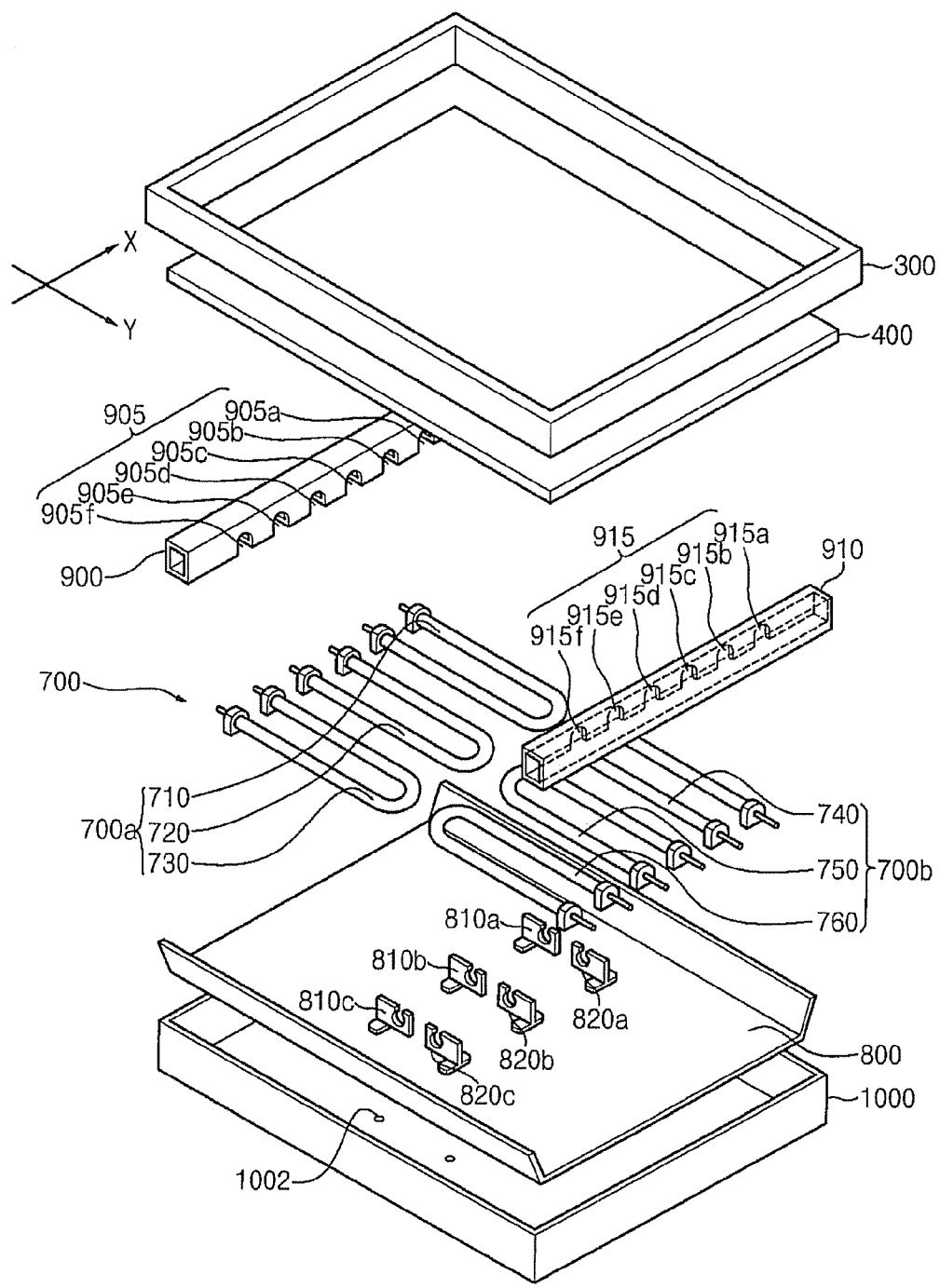
FIG. 7 is an exploded perspective view illustrating a backlight assembly according to another exemplary embodiment of the present invention.

FIG. 7 is an exploded perspective view illustrating a backlight assembly according to another exemplary embodiment of the present invention. The same reference numerals will be used to refer to the same or like parts as those described referring to FIG. 1.

Referring to FIG. 7, a backlight assembly according to this exemplary embodiment of the present invention includes a lamp unit 700, a reflection plate 800 that is disposed under the lamp unit 700 and retains the lamp unit 700, a bottom chassis 1000 receiving the reflection plate 800 and the lamp unit 700, a diffusion plate 400 disposed over the lamp unit 700 to diffuse a light generated by the lamp unit 700, and a mold frame 300 disposed at the diffusion plate 400.

The backlight assembly further includes a first covering member 900 corresponding to a first side of the lamp unit 700 and a second covering member 910 corresponding to a second side of the lamp unit 700. For example, the first covering member 900 makes contact with a first wall of the bottom chassis 1000, and the second covering member 910 makes contact with a second wall of the bottom chassis 1000.

The lamp unit 700 includes a first lamp group 700a and a second lamp group 700b. The hot and cold electrodes of the first lamp group 700a are disposed under the first covering member 900, and the hot and cold electrodes of the second lamp group 700b are disposed under the second covering member 910.

The first lamp group 700a includes first, second and third lamps 710, 720 and 730. The second lamp group 700b includes fourth, fifth and sixth lamps 740, 750 and 760. The hot and cold electrodes of the first, second and third lamps 710, 720 and 730 face a same direction, and the hot and cold electrodes of the fourth, fifth and sixth lamps 740, 750 and 760 face a same direction. The first, second, third, fourth, fifth and sixth lamps 710, 720, 730, 740, 750 and 760 each have a general U-shape or a general C-shape.

The first, second and third lamps 710, 720 and 730 are arranged along a first direction X. The fourth, fifth and sixth lamps 740, 750 and 760 are also arranged along the first direction X, and are spaced apart from the first, second and third lamps 710, 720 and 730, respectively, along a second direction Y. The first direction X is substantially perpendicular to the second direction Y. In an exemplary embodiment, the first, second and third lamps 710, 720 and 730 are symmetric with the fourth, fifth and sixth lamps 740, 750 and 760 with respect to a virtual line extended between them in the first direction X.

The first covering member 900 includes a first insertion aperture group 905 for receiving the hot and cold electrodes of each of the first, second and third lamps 710, 720 and 730. The first insertion aperture group 905 includes first, second, third, fourth, fifth and sixth insertion apertures 905a, 905b, 905c, 905d, 905e and 905f.

The second covering member 910 includes a second insertion aperture group 915 for receiving the hot and cold electrodes of the fourth, fifth and sixth lamps 740, 750 and 760. The second insertion aperture group 915 includes seventh to twelfth insertion apertures 915a, 915b, 915c, 915d, 915e and 915f.

The first and second covering members 900 and 910 have substantially a same structure as a structure of the first and second covering members 600 and 610 in FIG. 1. Therefore, any further explanation will be omitted.

First, second and third inverters (not shown) apply power voltages to the first, second and third lamps 710, 720 and 730, respectively, and are disposed at the first side of the bottom chassis 1000, at which the first covering member 900 is disposed. Fourth, fifth and sixth inverters (not shown) apply power voltages to the fourth, fifth and sixth lamps 740, 750 and 760, respectively, are disposed at the second side of the bottom chassis 1000, at which the second covering member 910 is disposed.

First, second, third, fourth, fifth and sixth lamp supporting members 810a, 810b, 810c, 820a, 820b and 820c are arranged in three by two matrix shape. In other words, the first, second and third lamp supporting members 810a, 810b and 810c form a first column so that the first, second and third lamp supporting members 810a, 810b and 810c are disposed corresponding to the first, second and third lamps 710, 720 and 730, respectively. The fourth, fifth and sixth lamp supporting members 820a, 820b and 820c form a second column so that the fourth, fifth and sixth lamp supporting members 820a, 820b and 820c are disposed corresponding to the fourth, fifth and sixth lamps 740, 750 and 760, respectively. The first column and the second column are substantially parallel to each other and extend in the first direction X.

Each of the first, second, third, fourth, fifth and sixth lamp supporting members 810a, 810b, 810c, 820a, 820b and 820c includes a supporting body 212, and first and second fixing units 214 and 216 formed at the supporting body 212 as shown in FIG. 3. The supporting body 212, and the first and second fixing units 214 and 216 are substantially same as that of FIGS. 1-3, therefore, any further explanation will be omitted.

The first, second, third, fourth, fifth and sixth lamp supporting members 810a, 810b, 810c, 820a, 820b and 820c prevent movement of the first, second, third, fourth, fifth and sixth lamps 710, 720, 730, 740, 750 and 760, respectively, and the first, second, third, fourth, fifth and sixth lamp supporting members 810a, 810b, 810c, 820a, 820b and 820c support the diffusion plate 400. Therefore, the diffusion plate 400 is prevented from sagging. The supporting body 212 has the height "h" that is greater than the external diameter w3 of the first, second, third, fourth, fifth and sixth lamps 710, 720, 730, 740, 750 and 760, so that a distance between the diffusion plate 400 and the first, second, third, fourth, fifth and sixth lamps 710, 720, 730, 740, 750 and 760 is uniformly maintained.

The reflection plate 800 and the bottom chassis 1000 include a first orifice (not shown) and a second orifice 1002, respectively. The second fixing unit 216 is inserted into the first orifice and the second orifice 1002, so that each of the first, second, third, fourth, fifth and sixth lamp supporting members 810*a*, 810*b*, 810*c*, 820*a*, 820*b* and 820*c* are fixed to the reflection plate 800 and the bottom chassis 1000.

The mold frame 300 is disposed on the diffusion plate 400, and the mold frame 300 compresses the diffusion plate 400 toward the chassis 1000. The mold frame 300 also supports a display panel (not shown) that is disposed thereon.

The reflection plate 800, the bottom chassis 1000 and the mold frame 300 are substantially same as those referred to in FIG. 1. Therefore, any further explanation will be omitted.

Figure 8:
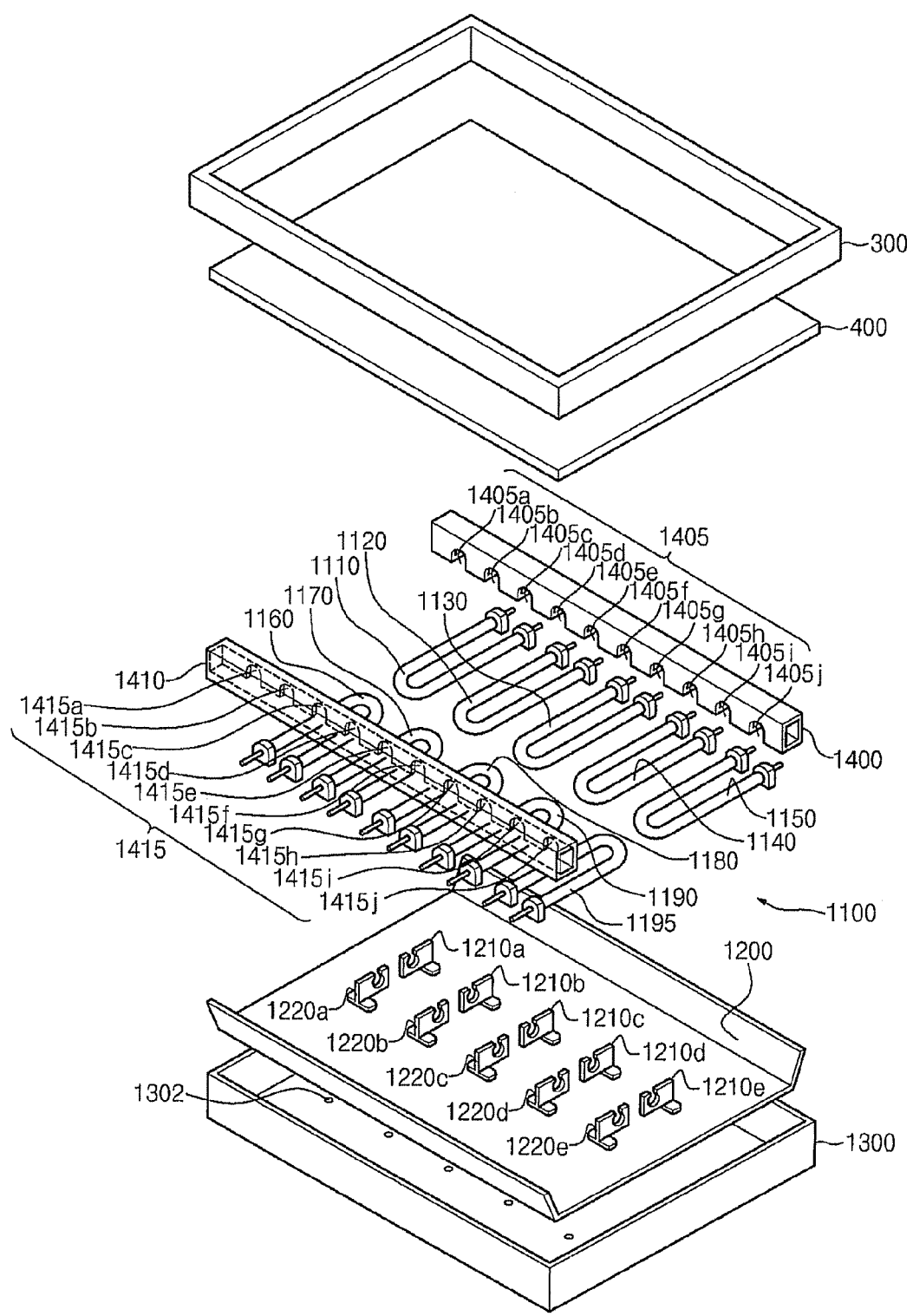
FIG. 8 is an exploded perspective view illustrating a backlight assembly according to another exemplary embodiment of the present invention.

FIG. 8 is an exploded perspective view illustrating a backlight assembly according to another exemplary embodiment of the present invention. The same reference numerals will be used to refer to the same or like parts as those described in reference to FIG. 1.

Referring to FIG. 8, a backlight assembly according to a third exemplary embodiment of the present invention includes a lamp unit 1100, a reflection plate 1200 disposed under the lamp unit 1100 to reflect light generated from the lamp unit 1100, a bottom chassis 1300 receiving the reflection plate 1200 and the lamp unit 1100, a first covering member 1400 adjacent to a first side of the bottom chassis 1300, a second covering member 1410 adjacent to a second side that is opposite to the first side, a diffusion plate 400 disposed over the lamp unit 1100 and a mold frame 300 disposed on the diffusion plate 400.

The lamp unit 1100 includes a first lamp group and a second lamp group. Hot and cold electrodes of the first lamp group correspond to the first covering member 1400. Hot and cold electrodes of the second lamp group correspond to the second covering member 1410.

The first lamp group includes first to fifth lamps 1110, 1120, 1130, 1140 and 1150. The second lamp group includes sixth to tenth lamps 1160, 1170, 1180, 1190 and 1195. Each of the first to tenth lamps 1110, 1120, 1130, 1140, 1150, 1160, 1170, 1180, 1190 and 1195 has a general U-shape or a general C-shape. Therefore, each of the first to tenth lamps 1110, 1120, 1130, 1140, 1150, 1160, 1170, 1180, 1190 and 1195 has the hot and cold electrodes that are disposed at a same covering member.

The first to fifth lamps 1110, 1120, 1130, 1140 and 1150 are disposed in a line along a lengthwise direction of the reflection plate 1200. The sixth to tenth lamps 1160, 1170, 1180, 1190 and 1195 are disposed in a line along the lengthwise direction of the reflection plate 1200. The first to fifth lamps 1110, 1120, 1130, 1140 and 1150 are spaced apart from the sixth to tenth lamps 1160, 1170, 1180, 1190 and 1195 along a widthwise direction that is substantially perpendicular to the lengthwise direction. In other words, the first to tenth lamps 1110, 1120, 1130, 1140, 1150, 1160, 1170, 1180, 1190 and 1195 are arranged in a two by five matrix shape.

The first covering member 1400 includes a first insertion aperture group 1405 for receiving the hot and cold electrodes of the first to fifth lamps 1110, 1120, 1130, 1140 and 1150. For example, the first aperture group 1405 includes first to tenth insertion apertures 1405*a*, 1405*b*, 1405*c*, 1405*d*, 1405*e*, 1405*f*, 1405*g*, 1405*h*, 1405*i* and 1405*j*.

The second covering member 1410 includes a second insertion aperture group 1415 for receiving the hot and cold electrodes of the sixth to tenth lamps 1160, 1170, 1180, 1190 and 1195. For example, the second aperture group 1415 includes eleventh to twentieth insertion apertures 1415*a*, 1415*b*, 1415*c*, 1415*d*, 1415*e*, 1415*f*, 1415*g*, 1415*h*, 1415*i* and 1415*j*.

The backlight assembly further includes first to tenth inverters (not shown). The first to fifth inverters apply power voltages to the first to fifth lamps 1110, 1120, 1130, 1140 and 1150, respectively, and are disposed at the first side of the bottom chassis 1300, at which the first covering member 1400 is disposed. The sixth to tenth inverters apply power voltages to the sixth to tenth lamps 1160, 1170, 1180, 1190 and 1195, respectively, and are disposed at the second side of the bottom chassis 1300, at which the second covering member 1410 is disposed.

The reflection plate 1200 is disposed under the first to tenth lamps 1110, 1120, 1130, 1140, 1150, 1160, 1170, 1180, 1190 and 1195 to reflect the light generated from the first to tenth lamps 1110, 1120, 1130, 1140, 1150, 1160, 1170, 1180, 1190 and 1195. The reflection plate 1200 also prevents movement of the first to tenth lamps 1110, 1120, 1130, 1140, 1150, 1160, 1170, 1180, 1190 and 1195.

For example, first to tenth lamp supporting members 1210*a*, 1210*b*, 1210*c*, 1210*d*, 1210*e*, 1220*a*, 1220*b*, 1220*c*, 1220*d* and 1220*e* that retain the first to tenth lamps 1110, 1120, 1130, 1140, 1150, 1160, 1170, 1180, 1190 and 1195, respectively, are attached to the reflection plate 1200. The first to tenth lamp supporting members 1210*a*, 1210*b*, 1210*c*, 1210*d*, 1210*e*, 1220*a*, 1220*b*, 1220*c*, 1220*d* and 1220*e* each grip a curved portion of each of the first to tenth lamps 1110, 1120, 1130, 1140, 1150, 1160, 1170, 1180, 1190 and 1195, respectively, to support the first to tenth lamps 1110, 1120, 1130, 1140, 1150, 1160, 1170, 1180, 1190 and 1195.

For example, the first to fifth lamp supporting members 1210*a*, 1210*b*, 1210*c*, 1210*d* and 1210*e* are arranged in a line along the lengthwise direction, and the sixth to tenth supporting members 1220*a*, 1220*b*, 1220*c*, 1220*d* and 1220*e* are also arranged along the lengthwise direction. The first to fifth lamp supporting members 1210*a*, 1210*b*, 1210*c*, 1210*d* and 1210*e* are spaced apart from the sixth to tenth supporting members 1220*a*, 1220*b*, 1220*c*, 1220*d* and 1220*e* along the widthwise direction of the bottom chassis 1300, respectively.

Each of the first to tenth lamp supporting members 1210*a*, 1210*b*, 1210*c*, 1210*d*, 1210*e*, 1220*a*, 1220*b*, 1220*c*, 1220*d* and 1220*e* includes a supporting body 212, and first and second fixing units 214 and 216 formed at the supporting body 212. The supporting body 212, and the first and second fixing units 214 and 216 are substantially same as in FIGS. 2 and 3, therefore, any further explanation will be omitted.

The first to tenth lamp supporting members 1210*a*, 1210*b*, 1210*c*, 1210*d*, 1210*e*, 1220*a*, 1220*b*, 1220*c*, 1220*d* and 1220*e* prevent movement of the first to tenth lamps 1110, 1120, 1130, 1140, 1150, 1160, 1170, 1180, 1190 and 1195, respectively, and the first to tenth lamp supporting members 1210*a*, 1210*b*, 1210*c*, 1210*d*, 1210*e*, 1220*a*, 1220*b*, 1220*c*, 1220*d* and 1220*e* support the diffusion plate 400. Therefore, the diffusion plate 400 is prevented from sagging. The supporting body 212 has a height "h" that is greater than the external diameter w3 of the first to tenth lamps 1110, 1120, 1130, 1140, 1150, 1160, 1170, 1180, 1190 and 1195, so that a distance between the diffusion plate 400 and the first to tenth lamps 1110, 1120, 1130, 1140, 1150, 1160, 1170, 1180, 1190 and 1195 is uniformly maintained.

The reflection plate 1200 and the bottom chassis 1300 include a first orifice (not shown) and a second orifice 1302, respectively. The second fixing unit 216 is inserted into the first orifice and the second orifice 1302, so that the first to tenth lamp supporting members 1210*a*, 1210*b*, 1210*c*, 1210*d*, 1210*e*, 1220*a*, 1220*b*, 1220*c*, 1220*d* and 1220*e* are attached to the reflection plate 1200 and the bottom chassis 1300.

The mold frame 300 is disposed on the diffusion plate 400, and the mold frame 300 compresses the diffusion plate 400 toward the chassis 1000. The mold frame 300 also supports a display panel (not shown) that is disposed thereon. The reflection plate 1200, the bottom chassis 1300 and the mold frame 300 are substantially same as those referred to in FIG. 1. Therefore, any further explanation will be omitted. The above-explained embodiments may be applied to various fields, such as, for example, a notice board, a signboard, etc. Hereinafter, an embodiment of a display apparatus will be explained.

Figure 9:
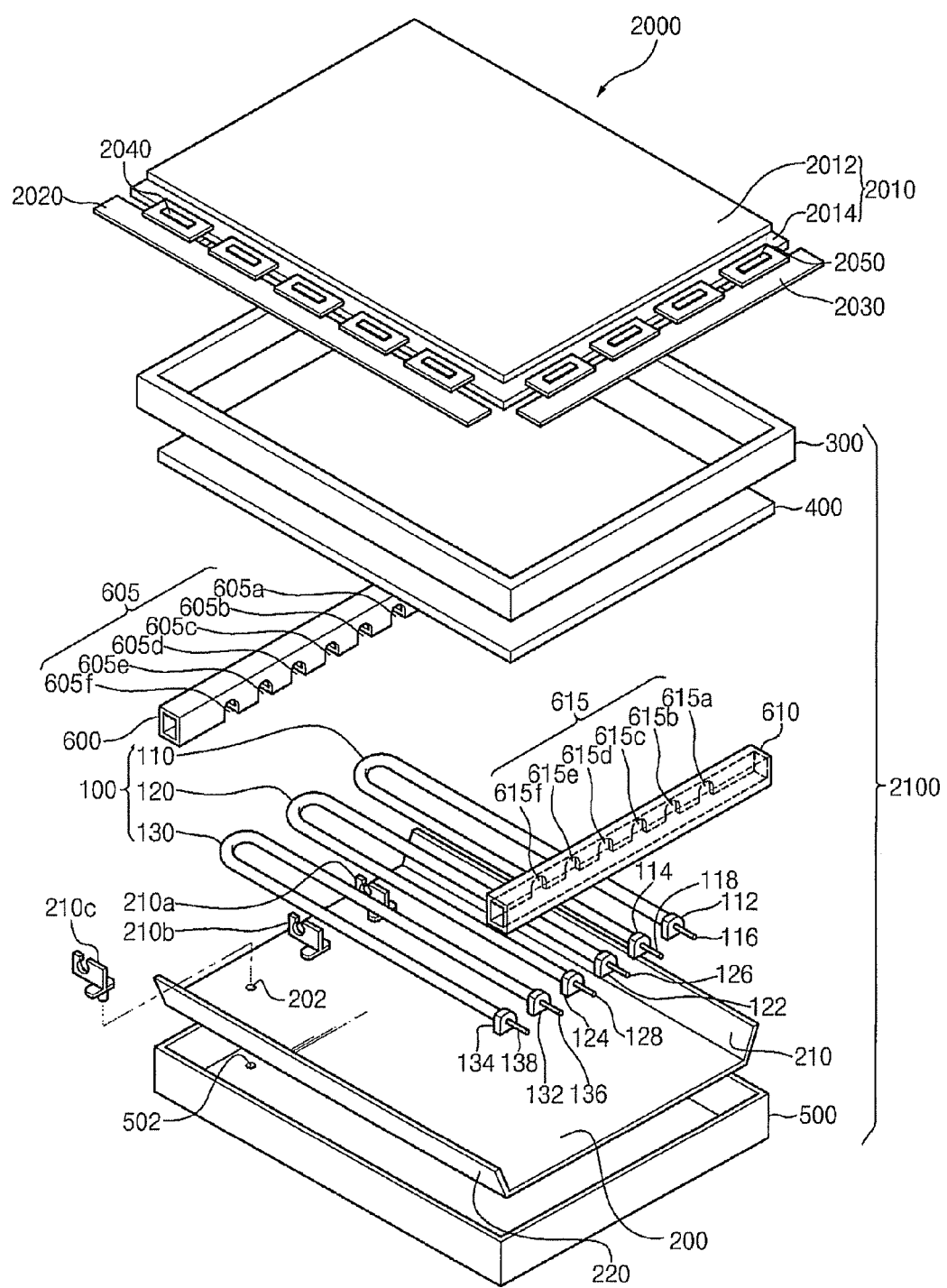
FIG. 9 is an exploded perspective view illustrating a display device according to an exemplary embodiment of the present invention.

FIG. 9 is an exploded perspective view illustrating a display device according to an exemplary embodiment of the present invention.

Referring to FIG. 9, a display device according to this exemplary embodiment of the present invention includes a display unit 2000 and a backlight assembly 2100.

The display unit 2000 includes a liquid crystal display (LCD) panel 2010, a data printed circuit board (PCB) 2020, a gate PCB 2030, a data driver chip 2040 and a gate driver chip 2050. Images are displayed through the LCD panel 2010. The data PCB provides the LCD panel 2010 with data signals through the data driver chip 2040, and the gate PCB provides the LCD panel 2010 with gate signals through the gate driver chip 2050.

The LCD panel 2010 includes a display region and a peripheral region. Images are displayed at the display region. The peripheral region surrounds the display region. The LCD panel 2010 includes a thin film transistor (TFT) panel 2014, a color filter panel 2012 facing the TFT panel 2014 and a liquid crystal layer (not shown) interposed between the TFT panel 2014 and the color filter panel 2012.

The backlight assembly 2100 includes a lamp unit 100, a reflection plate 200, a mold frame 300, a diffusion plate 400, a bottom chassis 500, a first covering member 600 and a second covering member 610. The same reference numerals will be used to refer to the same or like parts as those described in FIG. 1.

The first and second covering members 600 and 610 are disposed in a region corresponding to the peripheral region of the LCD panel 2010. The first covering member 600 is disposed over the curved portion of each lamp in the lamp unit 100, and the second covering member 610 is disposed over the hot and cold electrodes of each lamp in the lamp unit 100.

Therefore, the curved portion of each lamp in the lamp unit 100 inserted into a first insertion aperture group 605 of the first covering member 600, and the hot and cold electrodes inserted into a second insertion aperture group 615 of the second covering member 610 are disposed under the peripheral region of the LCD panel 2010.

First, second and third lamp supporting members 210a, 210b and 210c are combined with the reflection plate 200 such that the first, second and third lamp supporting members 210a, 210b and 210c correspond to the curved portion of each of the first, second and third lamps 110, 120 and 130. Therefore, the first, second and third lamp supporting members 210a, 210b and 210c are also disposed under the peripheral region.

The display unit 2000 is disposed on the mold frame 300 of the backlight assembly 2100. The backlight assembly 2100 according to the present embodiment is identical with that referred to in FIG. 1. Therefore, any further explanation will be omitted.

In the present embodiment, the display apparatus employs the backlight assembly of, for example, FIG. 1. Alternatively, the display apparatus may employ the backlight assembly of other exemplary embodiments.

According to the present invention, the lamp supporting member gripping the curved portion of the lamp having the general U-shape or the general C-shape is formed. Lamps are arranged such that the curved portions of the lamps are covered by the covering members. The lamps may be arranged in more than one row or more than one column. Therefore, the C-shaped lamps may reduce a number of inverters, thereby lowering cost and time of manufacturing the backlight assembly. Furthermore, reliability of the display device may be enhanced.

The curved portions of the lamps arranged in one column are covered by the covering members. Thus, symmetric luminance between left side and right side may be maintained. Furthermore, a bright line that may be displayed on the LCD panel may be prevented to enhance display quality.

The lamp supporting member has a higher height than the external diameter of the lamps. Therefore, the lamp supporting member prevents contact between the lamp and the diffusion plate, thereby protecting the lamp from the diffusion plate. Furthermore, the lamp supporting member prevents the diffusion plate from sagging. Thus, the lamp supporting member may maintain a substantially constant distance between the lamp and the diffusion plate, so that uniformity of luminance between regions may be enhanced.

Having described the exemplary embodiments of the present invention and its advantages, it is noted that various changes, substitutions and alterations can be made herein without departing from the spirit and scope of the invention as defined by appended claims.

What is claimed is:

1. A lamp supporting member for supporting a lamp having a curved portion disposed at a first side thereof and at least two electrodes disposed at a second side thereof disposed substantially opposite to the first side, the lamp supporting member comprising:
   an elastic supporting body comprising a flexible insulative material, the elastic supporting body having an aperture and a channel from an upper outside of the supporting body to the aperture, the aperture having a first diameter and passing through the elastic supporting body in a horizontal direction to support the curved portion of the lamp, the channel extending in a vertical direction substantially perpendicular to the horizontal direction and elastically opening an upper side of the elastic supporting body to insert the curved portion of the lamp into the aperture therethrough;
   a first fixing unit extending from the elastic supporting body and supporting the elastic supporting body; and
   a second fixing unit protruding from a bottom surface of the first fixing unit, wherein the bottom surface of the first fixing unit extends substantially perpendicular to the vertical direction;
   wherein the elastic supporting body provides support to the curved portion of the lamp, and
   wherein a width of the channel is smaller than a length from an upper outside of the elastic supporting body to the aperture.

2. The lamp supporting member of claim 1, wherein the flexible material of the elastic supporting body includes silicone.

3. The lamp supporting member of claim 1, wherein the first diameter of the aperture is smaller than an external diameter of the curved portion of the lamp.

4. The lamp supporting member of claim 1, wherein the width of the channel is smaller than the first diameter of the aperture.

5. The lamp supporting member of claim 1, wherein the width of the channel is uniform along its entire length.

6. The lamp supporting member of claim 1, wherein the elastic supporting body has a cross-section substantially the same as a rectangular shape.

7. The lamp supporting member of claim 1, wherein at least a portion of the channel has a uniform width.

8. A backlight assembly comprising:
a receiving container including an orifice disposed therein;
a lamp supporting member disposed on the first receiving container, the lamp supporting member comprising:
an elastic supporting body comprising a flexible insulative material, the elastic supporting body having an aperture and a channel from an outside of the elastic supporting body to the aperture, the aperture having a first diameter and passing through the elastic supporting body in a horizontal direction, the channel extending in a vertical direction substantially perpendicular to the horizontal direction and elastically opening an upper side of the elastic supporting body;
a first fixing unit extending from the elastic supporting body and contacting the receiving container; and
a second fixing unit protruding from a bottom surface of the first fixing unit and inserting into the orifice of the receiving container to fix the lamp supporting member to the receiving container; and
a lamp unit disposed on the receiving container, the lamp unit having a curved portion disposed at a first side thereof and at least two electrodes disposed at a second side thereof substantially opposite to the first side, the curved portion being inserted into the aperture through the channel of the lamp supporting member,
wherein the bottom surface of the first fixing unit extends substantially perpendicular to the vertical direction; and
wherein the elastic supporting body provides support to the curved portion of the lamp unit, and
wherein a width of the channel is smaller than a length from an upper outside of the elastic supporting body to the aperture.

9. The backlight assembly of claim 8, wherein the flexible material of the elastic supporting body includes silicone.

10. The backlight assembly of claim 8, wherein the first diameter of the aperture is smaller than an external diameter of the curved portion of the lamp.

11. The backlight assembly of claim 8, wherein the width of the channel is smaller than the first diameter of the aperture.

12. The lamp supporting member of claim 8, wherein the width of the channel is uniform along its entire length.

13. The backlight assembly of claim 8, further comprising a reflection plate disposed between the receiving container and the lamp unit to reflect light generated from the lamp unit.

14. The backlight assembly of claim 8, further comprising:
a first covering member disposed at the first side of the lamp unit and covering the curved portion of the lamp unit; and
a second covering member disposed at the second side of the lamp unit and covering the at least two electrodes of the lamp unit.

15. The backlight assembly of claim 8, wherein the elastic supporting body has a cross-section substantially the same as a rectangular shape.

16. The backlight assembly of claim 8, wherein at least a portion of the channel has a uniform width.

17. A display device comprising:
a first receiving container including an orifice disposed therein;
a lamp supporting member comprising:
an elastic supporting body comprising a flexible insulative material, the elastic supporting body having an aperture and a channel from an outside of the elastic supporting body to the aperture, the aperture having a first diameter and passing through the elastic supporting body in a horizontal direction, the channel extending in a vertical direction substantially perpendicular to the horizontal direction and elastically opening an upper side of the elastic supporting body;
a first fixing unit extending from the elastic supporting body and contacting the receiving container; and
a second fixing unit protruding from a bottom surface of the first fixing unit and inserting into the orifice of the first receiving container to fix the lamp supporting member to the receiving container;
a lamp unit disposed on the receiving container, the lamp unit having a curved portion disposed at a first side thereof and at least two electrodes disposed at a second side thereof disposed substantially opposite to the first side, the curved portion being inserted into the aperture through the channel of the lamp supporting member; and
a display unit disposed over the lamp unit, wherein the display unit displays an image using light generated from the lamp unit,
wherein the bottom surface of the first fixing unit extends substantially perpendicular to the vertical direction; and
wherein the elastic supporting body provides support to the curved portion of the lamp unit, and
wherein a width of the channel is smaller than a length from an upper outside of the elastic supporting body to the aperture.

18. The display device of claim 17, wherein the flexible material of the elastic supporting body includes silicone.

19. The display device of claim 17, wherein the first diameter of the aperture is smaller than an external diameter of the curved portion of the lamp.

20. The lamp supporting member of claim 17, wherein the width of the channel is uniform along its entire length.

21. The display device of claim 17, wherein the elastic supporting body has a cross-section substantially the same as a rectangular shape.

22. The display device of claim 17, wherein at least a portion of the channel has a uniform width.

* * * * *